May 3, 1955     H. B. SHAPER     2,707,769
MAGNETIC FIELD STRENGTH MEASURING DEVICES
Filed Nov. 3, 1953     2 Sheets-Sheet 1
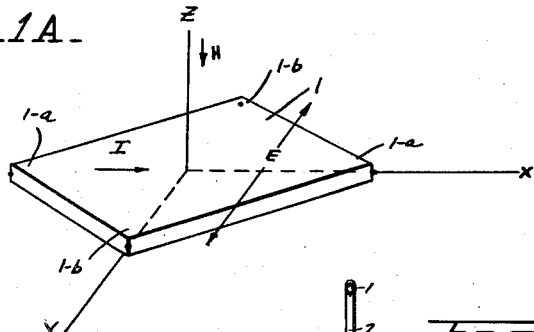
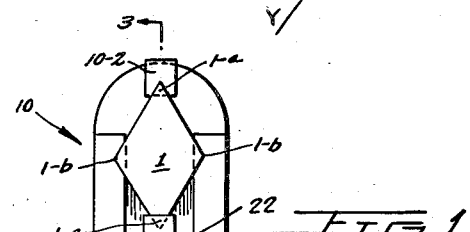
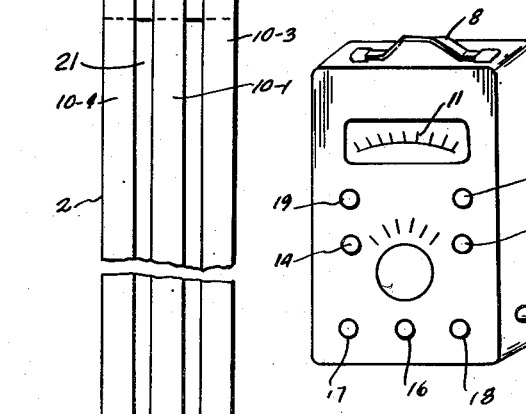
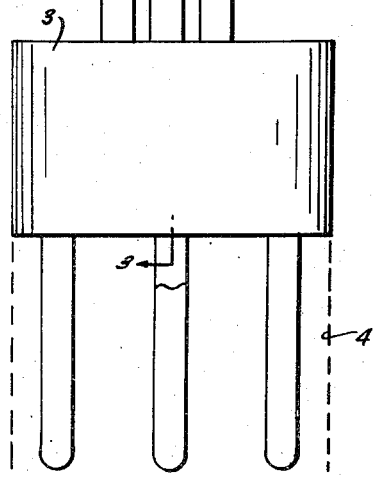
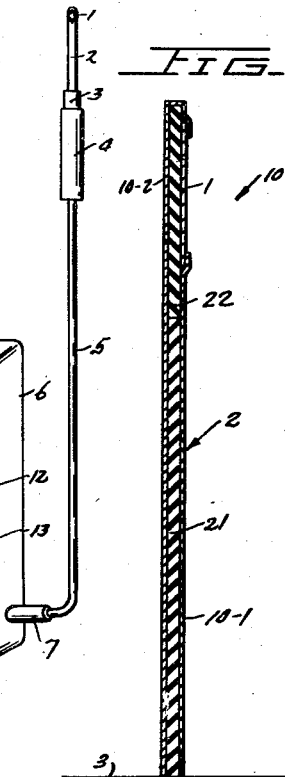
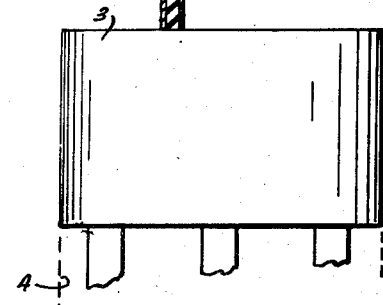
INVENTOR.
HARRY B. SHAPER
BY
Greene, Prinster & Dunn
ATTORNEYS

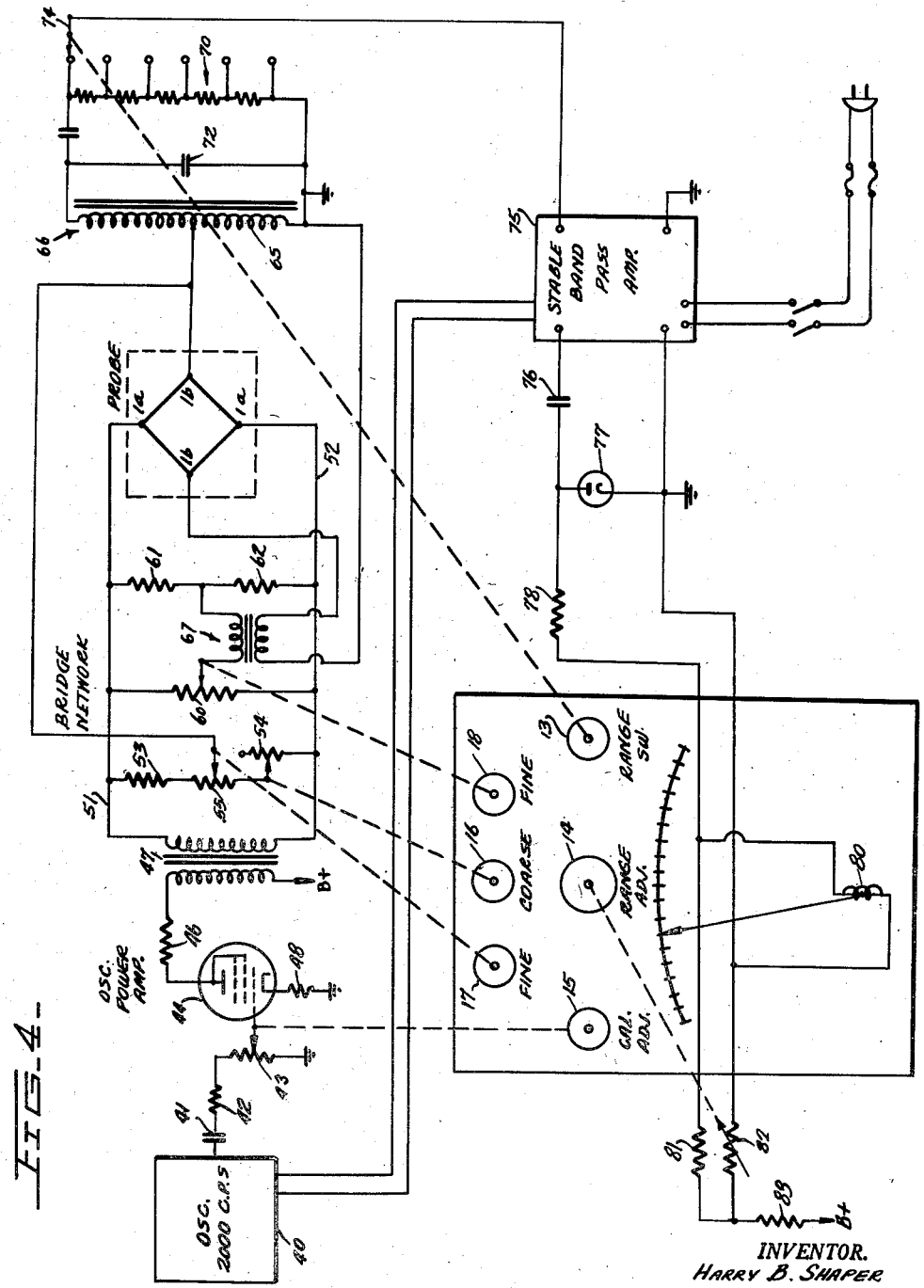

2,707,769
Patented May 3, 1955

2,707,769
MAGNETIC FIELD STRENGTH MEASURING DEVICES

Harry B. Shaper, New Hyde Park, N. Y., assignor to Dyna-Labs Inc., a corporation of New York Application November 3, 1953, Serial No. 390,047

12 Claims. (Cl. 324—45)

This application is a continuation in part of my application Ser. No. 274,844, filed March 5, 1952, now abandoned.

This invention relates to devices for measuring the strength and direction of magnetic fields, and more particularly to such devices which utilize the "Hall effect" for such measurement, and to processes for forming the Hall probe for such device.

Among the objects of the invention is magnetic field measuring devices of the foregoing type which is more reliable in and more effective for determining the strength of the magnetic field by means of the Hall effect, an utilizing a Hall element, the construction of which avoids the difficulties connected with the construction of the Hall element of the best prior devices of this type.

The foregoing and other objects will be best understood from the following description of exemplifications thereof, reference being had to the accompanying drawings, wherein, Fig. 1 is a perspective view of a complete instrument of the invention showing its handiness and extreme portability;

Fig. 1-A is a greatly exaggerated enlarged view of a probe element utilizing the "Hall effect";

Fig. 2 is a greatly enlarged elevational front view of one form of probe structure exemplifying the invention using the probe element of Fig. 1-A;

Fig. 3 is a cross-sectional view along line 3—3 of Fig. 2; and

Fig. 4 is a circuit diagram of one form of a measuring device exemplifying the invention which utilizes a probe element of Figs. 2 and 3.

In Pearson Patent No. 2,562,120 assigned to Bell Telephone Laboratories and in his article in Review of Scientific Instruments of 1948, volume 19, pp. 263 to 265, there is described a device for determining the strength of a magnetic field by means of a probe embodying the Hall effect. The Hall effect may be described by reference to Fig. 1-A showing greatly enlarged a thin stratum or layer 1 of conductive material lying in the plane of the two perpendicular axes X and Y. If an electric current, indicated by arrow I, flows through the conductive layer 1 in the direction of the X axis which serves as the current axis, while the layer 20 is exposed to a magnetic field having the direction of the Z axis or perpendicular to the plane of the conductive layer 20, an electrical potential or voltage will be induced between the spaced elements of the conductive layer 1 along the axis Y which may be considered the voltage axis and is transverse to the current axis X along which the current is flowing. The so induced voltage is proportional to the strength of the magnetic field, and is known as the Hall effect. The Hall effect occurs because the magnetic field causes the electrons flowing in the conductive layer 20 to travel in curved path thus charging up the transverse elements of the layer 1 until the resulting transverse electric field is of a magnitude which cancels the effect of the magnetic field and causes the electrons to travel through the stratum as though the magnetic field was not present.

The magnitude of the induced Hall potential is given by the equation $$E = K\frac{IH}{d}$$

wherein

E is the voltage induced across the Y axis,
I is the current flowing in the X axis,
H is the strength of the magnetic field along the Z axis,
d is the thickness of the conductive layer, and
K is the Hall coefficient.

The Hall coefficient is a constant which depends on the character of the material forming the conductive stratum. The table below gives the Hall coefficient for germanium, bismuth, tellurium and copper and also the resistivity in ohm-centimeters.

| Material | Hall Coefficient | Resistivity |
| --- | --- | --- |
| Germanium (crystalline) | 8 (10)⁻⁵ | 5.7 |
| Bismuth | 1 (10)⁻⁸ | 1.1 (10)⁻⁴ |
| Tellurium | 5.3 (10)⁻⁷ | 0.2 |
| Copper | 5.2 (10)⁻¹³ | 1.7 (10)⁻⁶ |

In the past, it was believed that because of the remarkably large Hall coefficient, and because of its very favorable ratio of Hall voltage to specific resistance, crystalline germanium would provide an ideal probe for a practical instrument to be used for measuring the strength of the magnetic field by means of the Hall effect, and such instrument using a special germanium probe of this type is described in the Pearson patent and the Pearson article referred to above. In making such germanium probes it was found essential to make it out of a germanium crystal because in its amorphous or allotropic form, germanium exhibits very little Hall effect. To produce the required probe of crystalline germanium, there was provided a thin support plate of fused quartz on which a crystalline layer of germanium is deposited from vapor of germanium which is heated in vacuum to about 1000° C. slightly above its melting point while the quartz plate support is heated to about 600° C.

The present invention is based on the discovery that, notwithstanding its inferiority to germanium as a Hall effect probe, a much more effective instrument for determining the strength of the magnetic field by the Hall effect is obtained by using a thin stratum of bismuth as a Hall probe and combining such bismuth probe with a circuit for producing by the Hall effect of such probe an alternating current voltage, the magnitude of which is used for indicating or determining the strength of the magnetic field to be measured. Such devices of the invention are much more stable in use and they are less sensitive to side effects and the required Hall effect probes are readily produced under the elimination of the difficulties and care required for providing suitable germanium probes.

The principles of the invention will now be described in connection with a portable commercial instrument of the size of known electronic volt meters and which operates with a very thin probe, only about .025 to .040 inch in thickness, connected to the instrument by a flexible cable. This instrument makes it possible to determine the magnetic strength of gaps only about .025 inch wide, with an accuracy of about ±1%. Furthermore, the field probe has an extremely small active surface area of the order of about .01 square inch, making it possible to investigate and determine the varying strength of non-uniform magnetic fields. Also, the probe itself is nonmagnetic and will not disturb or vary the magnetic field to be measured.

Fig. 1 shows a commercial form of a measuring instrument of the invention. It comprises a probe element 1 mounted at the end of a thin relatively stiff probe support 2. The probe support 2 is carried on a base 3 having a conventional detachable plug connection to a grip member 4 which may be gripped in the hand when making measurements. The probe grip 4 is connected through a flexible cable 5 containing conductors leading from the probe 1 to an instrument box 6 by a conventional jack connector 7. The instrument box 6 is of rectangular shape and somewhat larger than the similarly shaped portable electronic volt meters of the type generally used in laboratories and it has at its narrow top a handle 8 for carrying the instrument while making measurements.

Within the upper part of the box 6 is mounted a conventional meter 11, the scale of which is shown through a window in the front panel 9 of the box 6. The panel 9 has also mounted thereon the various controls of the instrument including a power supply switch 12, a range control knob 13, a range adjustment knob 14, a calibration knob 15, a coarse adjustment knob 16, two fine adjustment knobs 17 and 18, and a power jack 19 arranged to receive the connector of a flexible rubber-sheathed power supply cord for supplying the instrument with electric power current from a conventional domestic 110 volt supply socket. The instrument box 6 contains all elements required for its operation in conjunction with the probe 1.

Figs. 2 and 3 show greatly enlarged the constructional features of one form of a probe structure of the invention designed for use with the instrument of Fig. 1. The probe structure generally designated 10 comprises a thin, stiff support strip 21 carried by its base 3 and provided at its upper free end with the probe element 1 of the invention.

The probe element 1 is shown formed of a thin quadrilateral stratum of bismuth arranged to constitute an electrically conductive bridge with one pair of diagonal corner terminals 1–a constituting one axially arranged pair of conjugate bridge terminals defining one bridge axis and with the other transverse pair of diagonal corner terminals 1–b constituting the other conjugate pair of bridge terminals defining the other 90° displaced bridge axis.

The bismuth probe stratum 1 is of very small thickness of the order of only about .001 inch or less down to about .0001 inch, although relatively satisfactory bismuth probes for instruments of the invention may be made with a bismuth stratum thickness up to about .005 inch in thickness. The thin bismuth stratum probe 1 is supported by a relatively stiff or rigid thin support plate member 22 of suitable insulating material. The probe support plate member 22 may be made of known ceramic material such as porcelain having high insulating properties or of quartz, mica or the like, and the actual probe of the instrument shown has a supporting plate 22 of ceramic material. The four corner terminals 1–a, 1–b of the probe bridge 1 have connected thereto terminal ends of four conductor leads 10–1, 10–2, 10–3, 10–4, shown in the form of four thin metal strips which extend in and form part of the thin support strip 21 of the probe. The lead strip 10–1 extending from the bottom bridge terminal 1–a of the probe and the two lead strips 10–3 and 10–4 extending from the pair of transverse bridge terminals 1–b of the probe lie substantially in a plane along a front stratum of the supporting strip 21. The fourth lead strip 10–2 which is connected to the upper bridge corner terminal 1–a of the probe, is bent and trained over the upper edge of the probe supporting plate 22 and trained along its back and along the rear stratum of the thin probe support 21 so as to be insulatingly spaced from the overlying lead strip 21 extending from the bottom bridge corner terminal of the probe 1.

To reduce the thickness of the probe structure, the supporting strip 21 is formed of a layer of cement applied to the three lead strips 10–1, 10–3, 10–4 of the probe 1 so that after drying, they form a self-supporting relatively stiff support strip formation 21 with the fourth lead strip 10–2 cemented to the rear of the strip formation so formed.

In the form shown in Fig. 2, the probe support plate 22 is somewhat wider than the distance between the transverse bridge terminals 1–b by a width corresponding approximately to somewhat less than the width of the terminal lead strips 10–1 to 10–4. The thin bismuth stratum of the probe 1 is deposited on its plate support 22 either by evaporation or by catophoresis.

By way of example, and without thereby limiting the invention thereto, but only to facilitate ready practice thereof, there will now be described one practical way for producing, by evaporation, a bismuth probe of the invention of the type described above.

To the probe supporting plate 22 are cemented the terminal ends of the four conductor strips 10–1, 10–2, 10–3, 10–4 in the positions in which they are shown in Figs. 2, 3 in overlapping relation with the four bridge corner terminals 1–a, 1–b. Thereafter, a mask of suitable material such as metal, for instance, is placed over the front face of the supporting plate 22, the mask having a rectangular opening corresponding to the rectangular shape of the bismuth stratum of the probe. The so-masked front face of the supporting plate 22 is exposed to a vaporized bismuth atmosphere so that the bismuth vapor deposits on the rectangular face area of the support plate 22 exposed through the rectangular mask opening until a rectangular stratum of bismuth of the desired small thickness and adhering to the underlying support plate 22 is formed thereon.

Since the processes for the deposition of metal vapor to form a shaped metallic surface on an exposed area of an insulating material such as ceramic material, are well known in the art, a more detailed description of the process for depositing the rectangular bismuth probe stratum on the area of the support plate exposed through the mask opening is not required. In general, the vapor coating process is affected in an evacuated space. The bismuth is heated in the evacuated space above its melting temperature and the mask face of the supporting plate 22 is exposed within the evacuated space to the bismuth vapor, thereby causing the vapor to deposit on the rectangular surface of the plate 22 exposed through the mask opening until the desired rectangularly shaped bismuth stratum of the desired thickness and adhering to the underlying plate surface has been deposited thereon.

In a practical probe used in a commercial form of the invention, a supporting plate 12 of ceramic material about .010 inch to .020 inch thickness is used. The deposited rectangular bismuth probe stratum has a thickness of .0005 inch. The distance between the diagonal corners 1–a of the probe bridge is about ¼ inch and the distance between the transverse corners 1–b of the probe bridge is about ⅛ inch, providing a probe having an effective area of only about .01 inch square.

In such Hall probes it is desirable that the voltage axis be perpendicular to the current axis. To connect a metal conductor element having a substantial width to a flat edge portion of a rectangular shaped Hall element having dimensions of the order of the dimensions of the conductor element itself at the exact mid-center point thereto would be practically impossible. By providing a rectangular bismuth probe stratum with four corners serving as the four bridge terminals and placing the four flat metal conductor strips so that end portions thereof overlap and make contact with the four small triangular corner portions of the probe stratum, accurate location of the current and voltage terminals of the Hall probe is achieved while assuring a good electrical contact between such terminals and their four external terminal conductors 10–1, 10–2, 10–3, 10–4.

A probe of the invention made in the manner described above, will have a maximum thickness of only about .015 to .030 inch, and the probe support strip 21 may be of even a lesser thickness.

The bottom end of the probe support 21 is shown held in a mounting base 23 provided with four terminal plugs 26 suitably anchored in an insulating portion of the base 30. The terminal ends of the four conductor lead strips 10–1, 10–2, 10–3, 10–4 of the supporting strip 21 are first electrically connected, as by soldering to the four exposed inward terminal portions of the four base plugs 26 and the bottom end of the probe support 21 is thereafter anchored in the base as by suitable insulating cement. The probe unit 10 with its base 3 may be readily detached from the jack connector 3 of the cord handle 4 and replaced or exchanged with another similar probe unit 10.

In accordance with the invention, an alternating current is caused to flow through the current axis of the probe bridge 1 so that when it is placed in a magnetic field a corresponding alternating current voltage is induced at the conjugate terminals of the other axis of the bridge, which voltage may be impressed as through a transformer with a gain of at least 100 on the input side of a stable and accurate band-pass amplifier, the rectified output of which is impressed on a conventional indicating instrument for indicating the strength of the magnetic field.

Fig. 4 shows a circuit diagram of a practical magnetic field measuring instrument based on the principles of the invention and operating with a probe of the type described in connection with Figs. 2 and 3. The bismuth stratum bridge probe 1 is supplied at its two bridge terminals 1–a of the current axis with an alternating current from an oscillator 40. The voltage induced at the bridge terminals 1–b of the other bridge axis of the bismuth stratum 1 are supplied through a circuit including step-up transformer 65 with a substantial gain to a stable band-pass amplifier 75. The output of the amplifier 75 is rectified and supplied to an operating coil 80 of a conventional galvanometer measuring instrument having a pointer which indicates on the meter scale the strength of the magnetic field to which the bismuth stratum probe 1 is exposed.

In Fig. 4, a stable oscillator generating a constant alternating signal of 2,000 cycles per second, is indicated at 40. The oscillator is of the conventional type and its constant oscillations are supplied through a circuit including a coupling capacitor 41 and a resistor 42 and an adjustable potentiometer 43 to a power amplifier tube 44 having a cathode connected through a cathode-biasing resistor 48 to ground. The plate circuit of the amplifier tube 44 includes a resistor 46 through which the amplified oscillator output is impressed by way of a coupling transformer 47 to two supply conductors 51, 52 which supply the alternating current to the bridge terminals 1–a of the current axis of the bismuth stratum probe 1.

The alternating potential output developed across the other bridge terminals 1–b of the voltage axis of the bismuth stratum 21 is impressed on the primary winding 65 of a coupling transformer 66 through which the alternating voltage output is impressed with a gain of about 100 on the band-pass amplifier 75 of the instrument. In the form shown, the coupling transformer 66 is shown as an auto transformer having a relatively large number of secondary windings which are timed by capacitor 72 to resonate at the frequency of oscillator 40 or in the case shown, at 2000 cycles per second.

In the form shown, the output of the transformer winding 66 is impressed through a coupling condenser 71 on a bank of range setting resistors 70 provided with a range switch 74 through which all or only a selected fraction of the amplified output developed across the transformer winding 66 is impressed on the amplifier 75 for enabling adjustable setting of the sensitivity or the range of the instrument. The band-pass filter amplifier 75 is of conventional type which operates with great stability for long periods of time such as used in conventional electronic volt meters and like precision instruments. The amplified output of the band-pass amplifier 75 is impressed through a coupling capacitor 76 on a rectifier 77 shown as a double diode tube for supplying through a resistor 78, a rectified measuring current to the operating coil 80 of the meter. The circuit connections to one side of the coil 80 of the meter includes a fixed resistor 81 and the circuit connections to the other side of the meter coil 80 include a variable resistor 82 in series with the resistor 83 through which it is connected to the positive plate supply B+ of the band-pass amplifier 75.

The current supply circuit with its leads 51, 52 of opposite polarity which supply the alternating current to the diagonal bridge terminals 1–a of the current axis of the bismuth stratum probe 1 are combined with elements which make it possible to compensate for any unbalance in the mechanical bridge structure of the thin bismuth stratum 1 of the probe and of the circuit elements with which it is interconnected.

To compensate for any resistive unbalance, there are connected between the opposite current supply leads 51, 52, circuit elements consisting of a fixed resistor 53, and an adjustable variable tap rheostat 55 serving as a fine adjusting rheostat having one end connected to a tap of an adjustable coarse-adjusting rheostat 54. The adjustable tap of series rheostat 55 is connected to one of the bridge output terminals 1–b of the probe so that by adjusting the tap of rheostats 54, 55, the bridge circuits may be resistively balanced. Other analogous balancing circuits may be used instead.

There is also made provision for inductively balancing the bridge. In the arrangement of Fig. 4, the output circuit from bridge output terminals 1–b to the primary winding 65 of the output coupling transformer 66 is shown connected through an auxiliary transformer 67 between an intermediate tap of two resistors 61, 62 connected to the bridge supply leads 51, 52 and an adjustable tap of a rheostat 60 likewise connected across the two supply leads 51, 52 and arranged so that by adjusting the tap of rheostat 60, the bridge circuits may be inductively balanced.

Although the scale of the meter 11 may be calibrated in any desired way, the commercial form of the instrument has the meter 11 calibrated to indicate on its scale the Hall effect in units of magnetic field strength, to wit, in gauss units. In practical meters of the invention, the range switch 14 operated by the instrument knob 13 makes it possible to set the instrument to operate with any of the following six linear ranges: 0.1, 0.3, 1, 3, 10 and 30 kilogauss full scale. The range may be further extended where necessary to a lower limit of 30 to 50 gauss full scale and an upper limit of 100 kilogauss full scale.

For balancing the instrument before making measurements, the following procedure may be used. The bismuth probe stratum 1 is placed in a position where it is not subject to any magnetic field or to one of only negligible strength, and the range switch 14 is set with its knob 13 in its highest setting position. The two fine adjustment rheostats 55, 60, are set with their knobs 17, 18 to the center of their range of rotation. Next, the coarse balancing rheostat 54 is adjusted with its knob 16 for a minimum reading on the meter. The range switch 74 is then set on the next lower range setting and the same process is repeated for each setting of the range switch. After having thus reduced with the coarse rheostat 54, the reading of the meter 11 to its lowest value for the lowest setting of the range switch 74, the meter reading is brought to zero by adjusting the two fine adjusting rheostats 55, 60 with their respective knobs 17, 18.

With the bridge network so balanced, the instrument may be calibrated as follows: The probe with its bismuth stratum probe element 1 is placed in a magnetic field of known strength, for instance 1000 gauss and adjusted until the meter indicates a maximum reading. The calibration adjusting rheostat 43 is then adjusted with its knob 15 until the meter indicates or reads 1000 gauss. If a different range is desired and the meter does not read zero at such range, the range adjustment rheostat is adjusted by its knob 14 until the meter reads zero.

Without in any way thereby limiting the invention, but only for enabling more ready practice of the same, there are given below circuit constants of a practical meter network of a device of the invention described above.

| | | |
|---|---|---|
| Resistor 42 | megohms | .18 |
| Resistor 46 | do | .0047 |
| Resistor 48 | do | .00039 |
| Resistor 53 | do | .00022 |
| Resistor 61 | do | .00022 |
| Resistor 62 | do | .00022 |
| Resistor 78 | do | .039 |
| Resistor 81 | do | .18 |
| Resistor 83 | do | 1.2 |
| Variable resistor 54 | do | .0005 |
| Variable resistor 82 | do | .025 |
| Potentiometer 43 | do | .025 |
| Potentiometer 55 | do | .00001 |
| Potentiometer 60 | do | .0005 |
| Capacitor 41 | microfarads | .001 |
| Capacitor 71 | do | .0015 |
| Capacitor 72 | do | .001 |
| Capacitor 76 | do | .1 |
| Tube 44, R. M. A | | 6AU6 |
| Tube 77, R. M. A | | 6AL5 |

The distinguishing features of the magnetic field measuring devices of the invention are of great advantage in the construction and use of such devices. Because of the low resistivity of bismuth, the thin bridge stratum formed by the vapor deposit of bismuth may be mechanically balanced in very simple way by removing edge portions of the stratum. The low impedance of the bridge circuit is very effective in suppressing pickup of disturbing potentials from extraneous sources while making measurements without requiring excessive shielding.

Although the probe of the invention in the form shown at 10 in Figs. 2, 3 is ideally suited for determining the intensity of a magnetic field in very small magnetic gaps, there are also applications which make it desirable to measure the strength of magnetic field within the depth of a cavity with the field directed generally parallel to the axis of the cavity. For such applications, the thin probe stratum 1 of a probe of the invention may be provided on a flat end of an elongated rod member not shown but generally similar to the structure of Figs. 2, 3 so that by inserting the rod probe into the cavity, the surface of probe stratum 1 will be exposed to a perpendicular magnetic field traversing the same for determining its field strength in the manner described above.

Although principles of the invention have been described above with a thin bismuth of rectangular shape, magnetic field-strength measuring instruments of the invention may be also made with bismuth probes having other shapes such as oval or circular shapes, it being only essential that the bismuth stratum of the probe shall have two transversely extending crossing axes each of substantial length, with one pair of opposite terminals at the opposite end regions of one of the two axes and a further pair of opposite terminals at the opposite end regions of the two axes.

The features and principles underlying the invention described above in connection with specific exemplifications, will suggest to those skilled in the art many other modifications thereof. It is accordingly desired that the appended claims be construed broadly and that they shall not be limited to the specific details shown and described in connection with exemplifications thereof.

I claim:

1. In a device for measuring magnetic field strength by the Hall effect, a thin probe structure having an extended bridge-shaped stratum of bismuth at most about 0.001 inch thick, which stratum has two transversely extending crossing bridge axes each of substantial length, said stratum having one pair of bridge terminals at the opposite end regions of one of said two axes, and a further pair of bridge terminals at the opposite end regions of the other of said two axes, a bridge circuit connected to said two pairs of terminals including an alternating current supply circuit and connections from said supply circuit to said one pair of terminals for causing predetermined alternating current to flow through said stratum in the general direction of said one axis, said bridge circuit also including an alternating current output circuit connected to said further pair of terminals of said stratum, said bridge circuit also including balancing circuit elements for resistively and inductively balancing said bridge circuit and determining means operative in response to the alternating current flowing in the output circuit of the balanced bridge circuit for causing said output circuit to give a predetermined indication when said stratum is exposed to a magnetic field of a predetermined strength.

2. In a device for measuring the magnetic field strength by the Hall effect, a thin probe structure insertable into a narrow gap and having an extended bridge-shaped stratum of metal of relatively low electrical resistance which stratum has two transversely extending bridge axes each of substantial length and defining two crossing axes of a bridge formed by said stratum, two opposite end regions of one of said two axes forming one pair of bridge terminals and two opposite end regions of the other of said two axes forming a further pair of bridge terminals, a pair of flat electrode leads extending generally parallel from said one pair of bridge terminals, an additional electrode lead extending generally parallel to said pair of leads from one of said further pair of bridge terminals, and a further electrode lead extending generally parallel to said pair of leads from the other of said further pair of bridge terminals, said further electrode lead being folded over the back of said stratum and a portion thereof extending back of said stratum.

3. In a device for measuring the magnetic field strength by the Hall effect, a thin probe structure insertable into a narrow gap and having an extended generally balanced bridge-shaped stratum of metal of relatively low electrical resistance, which stratum has two transversely extending crossing bridge axes, two opposite end regions of one of said two axes forming one pair of bridge terminals and two opposite end regions of the other of said two axes forming a further pair of bridge terminals, a pair of flat electrode leads extending generally parallel from said one pair of bridge terminals, an additional electrode lead extending generally parallel to said pair of leads from one of said further pair of bridge terminals, and a further electrode lead extending generally parallel to said pair of leads from the other of said further pair of bridge terminals, said further electrode lead being folded over the back of said stratum and a portion thereof extending back of said stratum.

4. In a device for measuring the magnetic field strength by the Hall effect, a thin probe structure insertable into a narrow gap and having an extended stratum of metal of relatively low electrical resistance which stratum has two transversely extending axes each of substantial length and defining two crossing axes of a bridge formed by said stratum, two opposite end regions of one of said two axes forming one pair of bridge terminals and two opposite end regions of the other of said two axes forming a further pair of bridge terminals, a pair of flat electrode leads extending generally parallel from said one pair of bridge terminals, an additional electrode lead extending generally parallel to said pair of leads from one of said further pair of bridge terminals, and a further electrode lead extending generally parallel to said pair of leads from the other of said further pair of bridge terminals, said further electrode lead being folded over the back of said stratum and a portion thereof extending back of said stratum.

5. In a device for measuring the magnetic field strength by the Hall effect, a thin probe structure insertable into a narrow gap and having an extended generally balanced bridge-shaped stratum of bismuth, which stratum has two transversely extending crossing bridge axes, each of substantial length, two opposite end regions of one of said two axes forming one pair of bridge terminals and two opposite end regions of the other of said two axes forming a further pair of bridge terminals, a pair of flat electrode leads extending generally parallel from said one pair of bridge terminals, an additional electrode lead extending generally parallel to said pair of leads from one of said further pair of bridge terminals, and a further electrode lead extending generally parallel to said pair of leads from the other of said further pair of bridge terminals, said further electrode lead being folded over the back of said stratum and a portion thereof extending back of said stratum.

6. In a measuring device as claimed in claim 2, all said electrode leads extending generally parallel to one of said axes.

7. In a measuring device as claimed in claim 3, all said electrode leads extending generally parallel to one of said axes.

8. In a device as claimed in claim 4, all said electrode leads extending generally parallel to one of said axes.

9. In a device as claimed in claim 2, a bridge circuit connected through said leads to said two pairs of terminals including an alternating current supply circuit and connections from said supply circuit to one pair of said two pairs of bridge terminals for causing alternating current to flow through said stratum in the general direction of one of said two axes, said bridge circuit also including an output circuit connected to the other pair of said two pairs of bridge terminals including determining means for determining the magnitude of the voltage developed at said other pair of bridge terminals, the circuits connected to said stratum including balancing elements for resistively and inductively balancing said bridge circuit and causing said output circuit to give a predetermined indication when said stratum is exposed to a magnetic field of a predetermined strength.

10. In a device as claimed in claim 3, a bridge circuit connected through said leads to said two pairs of terminals including an alternating current supply circuit and connections from said supply circuit to said one pair of said two pairs of bridge terminals for causing alternating current to flow through said stratum in the general direction of one of said two axes, said bridge circuit also including an output circuit connected to the other pair of said two pairs of bridge terminals including determining means for determining the magnitude of the voltage developed at said other pair of terminals, the circuits connected to said stratum including balancing elements for resistively and inductively balancing said bridge circuit and causing said output circuit to give a predetermined indication when said stratum is exposed to a magnetic field of a predetermined strength.

11. In a device as claimed in claim 4, a bridge circuit connected through said leads to said two pairs of terminals including an alternating current supply circuit and connections from said supply circuit to one pair of said two pairs of bridge terminals for causing alternating current to flow through said stratum in the general direction of one of said two axes, said bridge circuit also including an output circuit connected to the other pair of said two pairs of bridge terminals including determining means for determining the magnitude of the voltage developed at said other pair of terminals, the circuits connected to said stratum including balancing elements for resistively and inductively balancing said bridge circuit and causing said output circuit to give a predetermined indication when said stratum is exposed to a magnetic field of a predetermined strength.

12. In a device as claimed in claim 5, a bridge circuit connected through said leads to said two pairs of terminals including an alternating current supply circuit and connections from said supply circuit to one pair of said two pairs of bridge terminals for causing alternating current to flow through said stratum in the general direction of one of said two axes, said bridge circuit also including an output circuit connected to the other pair of said two pairs of bridge terminals including determining means for determining the magnitude of the voltage developed at said other pair of terminals, the circuits connected to said stratum including balancing elements for resistively and inductively balancing said bridge circuit and causing said output circuit to give a predetermined indication when said stratum is exposed to a magnetic field of a predetermined strength.

References Cited in the file of this patent

UNITED STATES PATENTS

| Number | Name | Date |
|---|---|---|
| 1,998,952 | Edgar et al. | Apr. 23, 1935 |
| 2,464,807 | Hansen | Mar. 22, 1949 |
| 2,543,640 | Millar et al. | Feb. 27, 1951 |
| 2,550,492 | Millar | Apr. 24, 1951 |
| 2,562,120 | Pearson | July 24, 1951 |